(12) United States Patent
Eckstein et al.

(10) Patent No.: US 11,993,324 B2
(45) Date of Patent: May 28, 2024

(54) GUARD ASSEMBLY FOR WORK MACHINE

(71) Applicant: Caterpillar Inc., Peoria, IL (US)

(72) Inventors: Emily Lynn Eckstein, Dunlap, IL (US); Thomas Howard Duffy, Peoria, IL (US); Robert Stephen Comer, Morton, IL (US); Robert Alan Jackson, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 375 days.

(21) Appl. No.: 17/449,960

(22) Filed: Oct. 5, 2021

(65) Prior Publication Data
US 2023/0104148 A1 Apr. 6, 2023

(51) Int. Cl.
B62D 55/088 (2006.01)
B62D 21/15 (2006.01)
B62D 25/20 (2006.01)
B62D 25/24 (2006.01)
E02F 9/08 (2006.01)

(52) U.S. Cl.
CPC ......... B62D 55/088 (2013.01); B62D 21/155 (2013.01); B62D 25/2072 (2013.01); B62D 25/24 (2013.01); E02F 9/0891 (2013.01); B60Y 2200/25 (2013.01)

(58) Field of Classification Search
CPC .............................. B62D 55/088; E02F 9/0891
See application file for complete search history.

(56) References Cited

U.S. PATENT DOCUMENTS

| | | | | |
|---|---|---|---|---|
| 3,670,835 A | * | 6/1972 | Ross | B62D 55/0845 180/69.1 |
| 3,826,327 A | | 7/1974 | Stover | |
| 3,927,729 A | * | 12/1975 | Gianessi | B62D 55/0845 180/69.1 |
| 4,957,180 A | * | 9/1990 | Lammers | B62D 55/0845 180/69.1 |
| 2002/0140287 A1 | * | 10/2002 | Fee | B62D 55/088 305/107 |
| 2014/0332292 A1 | | 11/2014 | Gopalsamy et al. | |
| 2015/0159344 A1 | | 6/2015 | Gopalsamy et al. | |
| 2015/0360731 A1 | * | 12/2015 | Gopalsamy | E02F 9/0833 180/69.1 |
| 2019/0178285 A1 | * | 6/2019 | McGregor | E02F 9/0891 |
| 2019/0300142 A1 | * | 10/2019 | Helsley | B64C 1/1461 |

FOREIGN PATENT DOCUMENTS

EP 1628000 2/2006

* cited by examiner

Primary Examiner — Brian L Swenson

(57) ABSTRACT

A guard assembly for a work machine includes at least one guard including a body. The body in part defines a volume, a first opening, at least one second opening, and at least one pair of first retention tabs. The door defines a first end and a second end. In an open position of the door, the door provides access to the volume and, in a closed position of the door, the door limits access to the volume. The door includes a plate removably coupled to the guard proximal to the first end of the door by at least one fastener, and at least one coupling arrangement extending from the plate for pivotably coupling the plate to the guard proximal to the second end of the door. The coupling arrangement includes a first portion coupled to the plate and a second portion extending from the first portion.

17 Claims, 9 Drawing Sheets

GUARD ASSEMBLY FOR WORK MACHINE

TECHNICAL FIELD

The present disclosure relates to a work machine, and more particularly, a guard assembly for the work machine and a method of accessing a volume of the guard assembly.

BACKGROUND

Work machines, such as track type tractors, wheel loaders, dozers, and the like, typically include one or more guards that are coupled to an underside of the work machine. The guard may protect one or more components of the work machine, such as an engine, a transmission system, pumps, and the like, by serving as a partial cover. For example, the guard may prevent contact of objects, such as, debris, rocks, etc. with the components of the work machine. Further, such work machines may be used in heavy debris applications which may involve a presence of waste, woodchips, dirt, soil, and/or sand. Such debris may accumulate within an interior volume of the guard and may increase the weight of the guard. Thus, the guard may have to be periodically cleaned to remove the debris therefrom.

As the guard is generally heavy, it may not be feasible to remove the entire guard for cleaning purposes. Thus, the guard may include access openings that may allow service personnel to access and clean the interior volume of the guard. Typically, the guard includes at least one door that may be opened to provide access to the interior volume of the guard.

Such a door is generally coupled to the guard at one end with fasteners and hingedly coupled to the guard at another end. A coupling mechanism that is used to hingedly couple the door with the guard is typically complicated and may require additional tools or equipment for movement of the door between the open and the closed positions. Further, a conventional door may be generally heavy and it may not be feasible for the service personnel to handle a weight of the door to move the door between an open position and a closed position. Thus, additional equipment may be required to hold the door in the open position. Use of such additional tools and equipment may increase the time needed for cleaning the guard and may also increase efforts required to clean the guard.

U.S. Patent Application Publication Number 2015/0159344 describes a bottom guard assembly for a machine that includes a guard element attached to a frame of the machine using mechanical fasteners. The bottom guard assembly further includes a door member pivotally coupled to an inner surface of the guard element via a hinge element. The bottom guard assembly also includes a torsion bar having a first end coupled to the inner surface of the guard element and a second end coupled to the hinge element. The bottom guard assembly further includes at least one holder element positioned between the first end of the torsion bar and the second end of the torsion bar, the at least one holder element attached to the inner surface of the guard element. The torsion bar is configured to rotate within the at least one holder element during opening of the door member.

SUMMARY OF THE DISCLOSURE

In one aspect of the present disclosure, a guard assembly for a work machine is provided. The guard assembly includes at least one guard including a body. The body defines in part a volume, a first opening for accessing the volume, at least one second opening in communication with the first opening, and at least one pair of first retention tabs partially overlapping the second opening. The guard assembly also includes at least one door removably coupled to the guard. The door defines a first end and a second end. In an open position of the door, the door provides access to the volume and, in a closed position of the door, the door limits access to the volume. The door includes a plate removably coupled to the guard proximal to the first end of the door by at least one fastener. The door also includes at least one coupling arrangement extending from the plate for pivotably coupling the plate to the guard proximal to the second end of the door. The door is movable between the open position and the closed position based on a pivoting action of the coupling arrangement relative to the guard. The coupling arrangement includes a first portion coupled to the plate. The coupling arrangement also includes a second portion extending from the first portion. The second portion is receivable within the second opening.

In another aspect of the present disclosure, a work machine is provided. The work machine includes a frame. The work machine also includes a guard assembly coupled to the frame. The guard assembly includes at least one guard including a body. The body defines in part a volume, a first opening for accessing the volume, at least one second opening in communication with the first opening, and at least one pair of first retention tabs partially overlapping the second opening. The guard assembly also includes at least one door removably coupled to the guard, the door defining a first end and a second end. In an open position of the door, the door provides access to the volume and, in a closed position of the door, the door limits access to the volume. The door includes a plate removably coupled to the guard proximal to the first end of the door by at least one fastener. The door also includes at least one coupling arrangement extending from the plate for pivotably coupling the plate to the guard proximal to the second end of the door. The door is movable between the open position and the closed position based on a pivoting action of the coupling arrangement relative to the guard. The coupling arrangement includes a first portion coupled to the plate. The coupling arrangement also includes a second portion extending from the first portion. The second portion is receivable within the second opening.

In yet another aspect of the present disclosure, a method of accessing a volume in part defined by a guard of a guard assembly. The guard assembly is associated with a work machine and includes at least one door removably coupled to the guard. The method includes removing at least one fastener of the door proximal to a first end of the door that removably couples a plate of the door to the guard. The guard includes a body, such that the body defines the volume, a first opening for accessing the volume, at least one second opening in communication with the first opening, and at least one pair of first retention tabs partially overlapping the second opening. The method also includes pivoting the door relative to the guard to move the door to an open position for accessing the volume. The door includes at least one coupling arrangement extending from the plate proximal to a second end of the door, such that the door is movable between a closed position and the open position based on a pivoting action of the coupling arrangement relative to the guard. Further, the coupling arrangement includes a first portion coupled to the plate. Moreover, the coupling arrangement includes a second portion, the second portion being receivable within the second opening.

Other features and aspects of this disclosure will be apparent from the following description and the accompanying drawings.

DETAILED DESCRIPTION

Wherever possible, the same reference numbers will be used throughout the drawings to refer to the same or like parts. Wherever possible, corresponding or similar reference numbers will be used throughout the drawings to refer to the same or corresponding parts.

Figure 1:
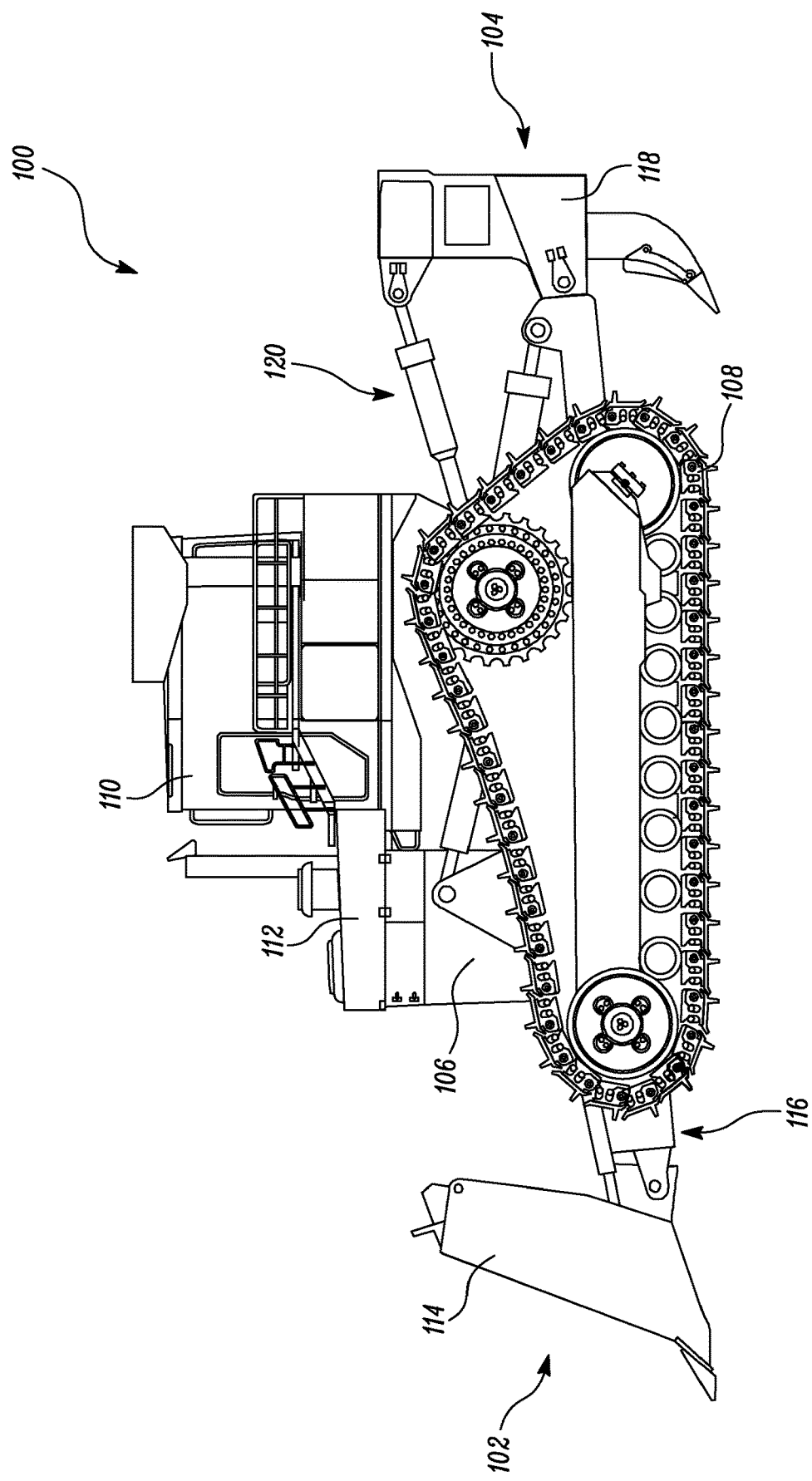
FIG. 1 illustrates a side view of a work machine, according to examples of the present disclosure.

FIG. 1 illustrates a side view of an exemplary work machine 100. The work machine 100 is embodied as a track type tractor herein. Alternatively, the work machine 100 may include a grader, a loader, a dozer, a compactor, an excavator, and the like, without any limitations. The work machine 100 defines a front end 102 and a rear end 104. The work machine 100 includes a frame 106. The frame 106 supports various components of the work machine 100, such as a pair of ground engaging members 108 (only one of which is illustrated herein), an operator station 110, a power source (not shown), and the like.

The power source may generate an output power for performing one or more work operations. The power source may embody an engine, batteries, fuel cells, and the like, without any limitations. The engine may be an internal combustion engine. The power source may be disposed within a compartment 112 defined by the frame 106. The work machine 100 may also include a first work implement 114 disposed proximate to the front end 102. The first work implement 114 may be operably connected to the frame 106 by a linkage assembly 116. The first work implement 114 may be used for material handling, material removal, and/or material transportation. In the illustrated embodiment of FIG. 1, the first work implement 114 is a blade. Alternatively, the first work implement 114 may include a bucket, or any other type of work implement, without any limitations. Further, the work machine 100 may include a second work implement 118 disposed proximate to the rear end 104.

In the illustrated embodiment of FIG. 1, the second work implement 118 is a ripper. Alternatively, the second work implement 118 may include any other type of work implement, without any limitations. The second work implement 118 may be operably connected to the frame 106 by a linkage assembly 120.

The work machine 100 also includes the pair of ground engaging members 108. Each ground engaging member 108 is embodied as a track herein. Alternatively, the work machine 100 may include wheels or drums instead of the tracks. Further, the work machine 100 includes the operator station 110. An operator of the work machine 100 may be seated within the operator station 110 for performing one or more work operations. Moreover, the work machine 100 may include other components (not shown), such as, a transmission system, a drive train, numerous hydraulic or pneumatic pumps, and the like, that may be supported by the frame 106 of the work machine 100.

Figure 2:
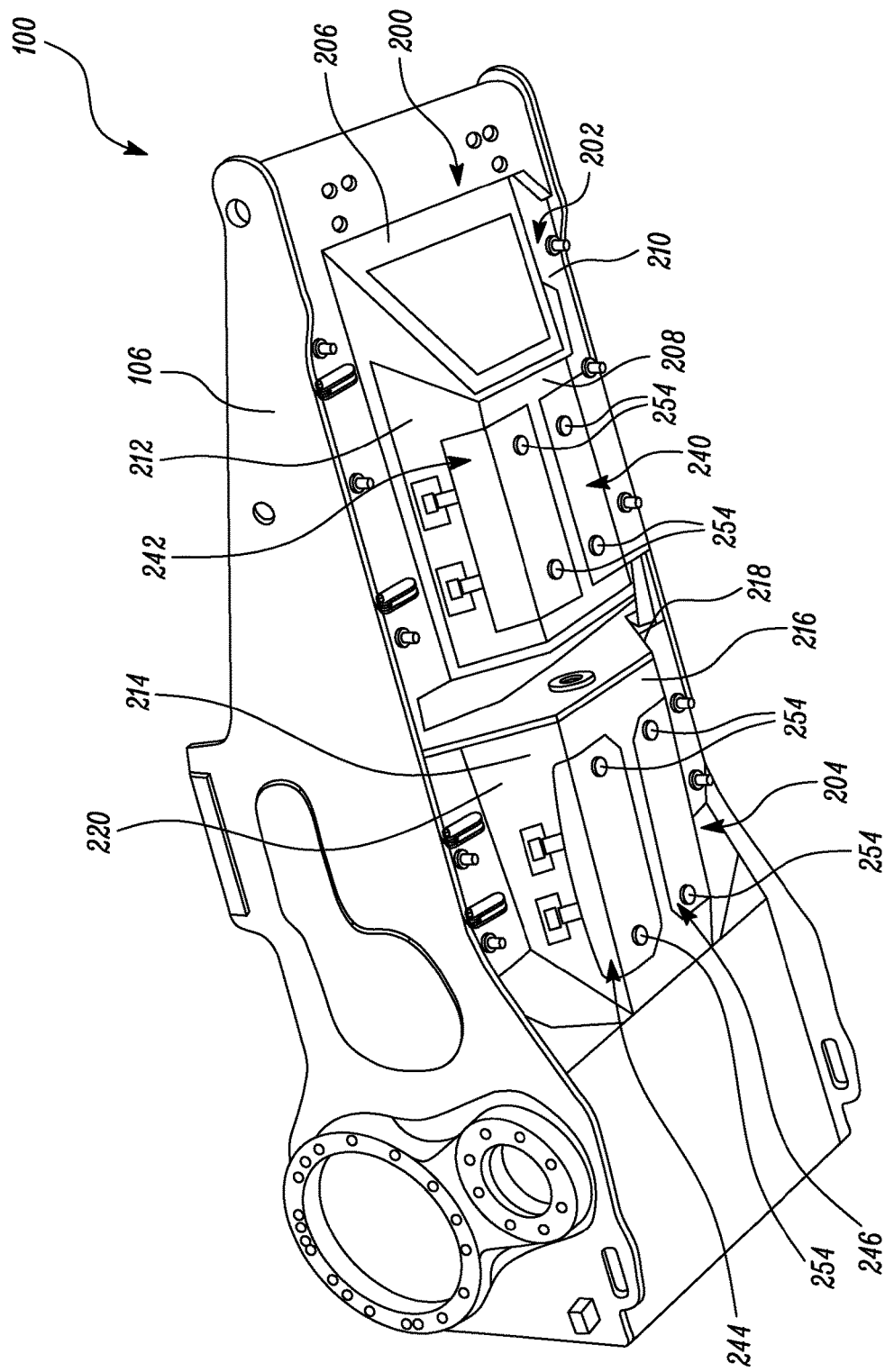
FIG. 2 illustrates a perspective view of a frame associated with the work machine of FIG. 1 and a guard assembly coupled to the frame, according to examples of the present disclosure.

Referring to FIG. 2, the present disclosure relates to a guard assembly 200 for the work machine 100. Specifically, the work machine 100 includes the guard assembly 200 coupled to the frame 106. The guard assembly 200 prevents contact of heavy debris with one or more components of the work machine 100, such as, the power source, the transmission system, pumps, and the like. The guard assembly 200 is coupled to an underside of the work machine 100, such that the guard assembly 200 aligns with one or more vulnerable components of the work machine 100.

The guard assembly 200 includes one or more guards 202, 204 including a body 206, 214. The guards 202, 204 are removably coupled to the frame 106. In an example, a number of fasteners (not shown), such as bolts or screws, may be used to couple the guards 202, 204 to the frame 106, without any limitations. In the illustrated embodiment of FIG. 2, the guard assembly 200 includes two guards 202, 204 that are spaced apart from each other. In various examples, the guard assembly 200 may include a single guard or more than two guards.

Moreover, the body 206 defines a central portion 208 and a pair of side portions 210, 212 that are angularly disposed relative to the central portion 208. The side portions 210, 212 may be symmetrical to each other about a direction of travel of the work machine 100 (e.g., forward and backward). The body 214 also defines a central portion 216 and a pair of side portions 218, 220 that are angularly disposed relative to the central portion 216. The side portions 218, 220 may be symmetrical to each other about the direction of travel of the work machine 100. In the illustrated embodiment of FIG. 2, a shape of the body 206 is different from a shape of the body 214. Alternatively, the shape of the body 206 may be identical to the shape to the body 214. Although the shape of the body 206 is different from the shape of the body 214, the body 206 and the body 214 may include similar components. It should be noted that the details provided herein regarding the body 206 of the guard 202 are equally applicable to the body 214 of the guard 204, without limiting the scope of the present disclosure.

Figure 3:
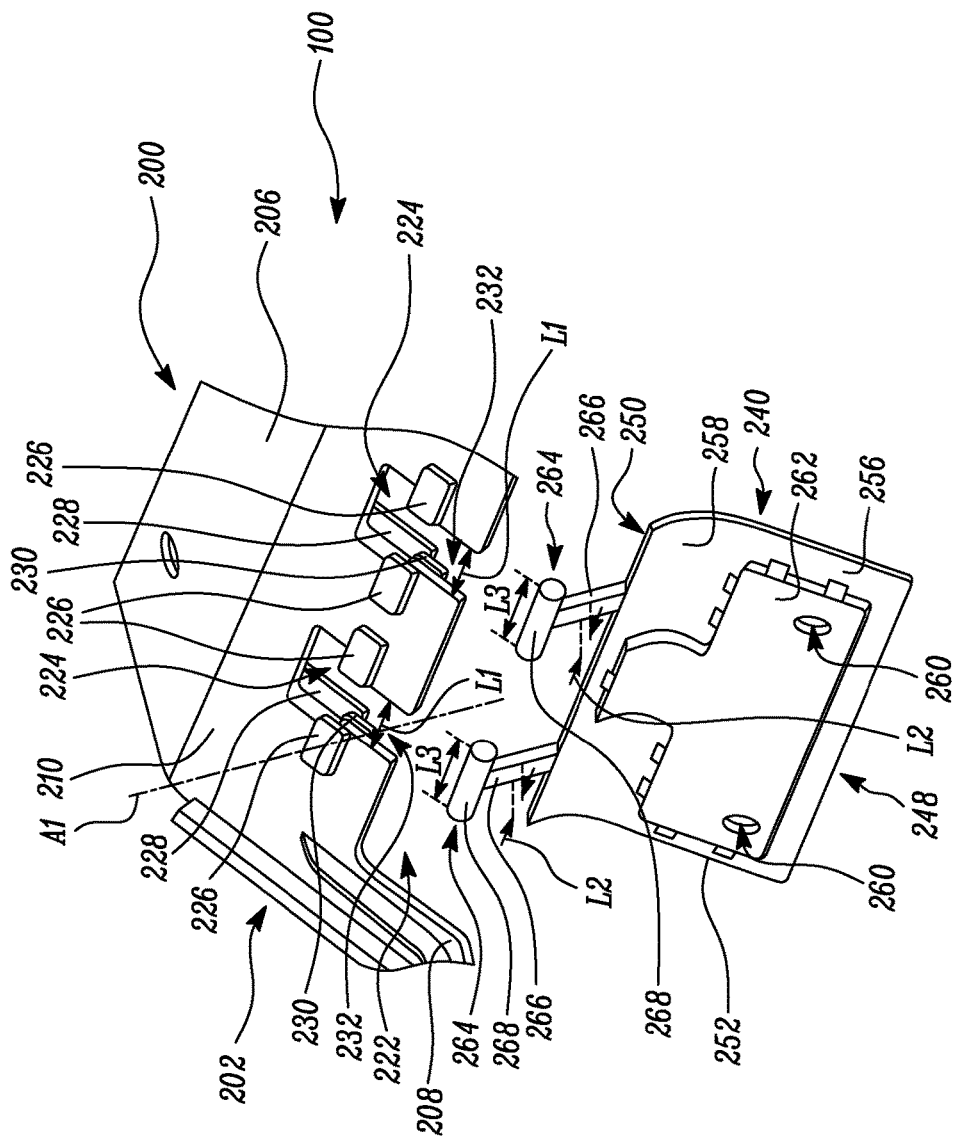
FIG. 3 illustrates, in generally downward perspective, an exploded view of a door and a guard associated with the guard assembly of FIG. 2, according to examples of the present disclosure.

FIG. 3 illustrates a section of the body 206 associated with the guard 202. Specifically, the side portion 210 and the central portion 208 of the body 206 are illustrated in FIG. 3. For explanatory purposes, a design of the side portion 210 and the central portion 208 will now be explained in detail in relation to FIG. 3. However, it should be noted that the details provided herein are equally applicable to the side portion 212 (see FIG. 2), without any limitations. The body 206 defines in part a volume "V1" (shown in FIG. 5), a first opening 222 (partially shown herein) for accessing the volume "V1", one or more second openings 224 in communication with the first opening 222, and one or more pairs of first retention tabs 226 partially overlapping the second opening 224. It should be noted that the central portion 208 and the pair of side portions 210, 212 together in part define the volume "V1" of the body 206. Further, the first opening 222 is together defined by a portion of the central portion 208, a portion of the side portion 210, and a portion of the side portion 212.

The side portion 210 defines two second openings 224 and includes two pairs of first retention tabs 226. The first retention tabs 226 each may include a generally rectangular shaped structure. Alternatively, the first retention tabs 226 may include any other shape. For example, the first retention tabs 226 may include a generally square shaped structure. Further, the guard 202 includes a pair of second retention tabs 228 that are spaced apart from the pair of first retention tabs 226 along a first axis "A1", such that the second opening 224 is defined between the pair of first retention tabs 226 and the pair of second retention tabs 228. The pair of second retention tabs 228 are substantially parallel to the pair of first retentions tabs 226. The side portion 210 defines two pair of second retention tabs 228. The second retention tabs 228 include a generally rectangular shaped structure. Alternatively, the second retention tabs 228 may include any other shape, for example, the second retention tabs 228 may include a generally square shaped structure. The second retention tabs 228 may be located on a different surface of the guard 202 than the first retention tabs 226, for example, the outer and inner surfaces, respectively.

Moreover, the guard 202 may also include a plate member 230 disposed between each first retention tab 226 and each second retention tab 228. The side portion 210 defines two pairs of plate members 230. Only one plate member 230 from each of the pair of plate members 230 is illustrated herein. The pair of plate members 230, the pair of first retention tabs 226, and the pair of second retention tabs 228 together define portions of the second opening 224. The body 206 further defines one or more channels 232 between the first opening 222 and the second opening 224. Specifically, the side portion 210 defines two channels 232. Each channel 232 defines a first length "L1".

Figure 4:
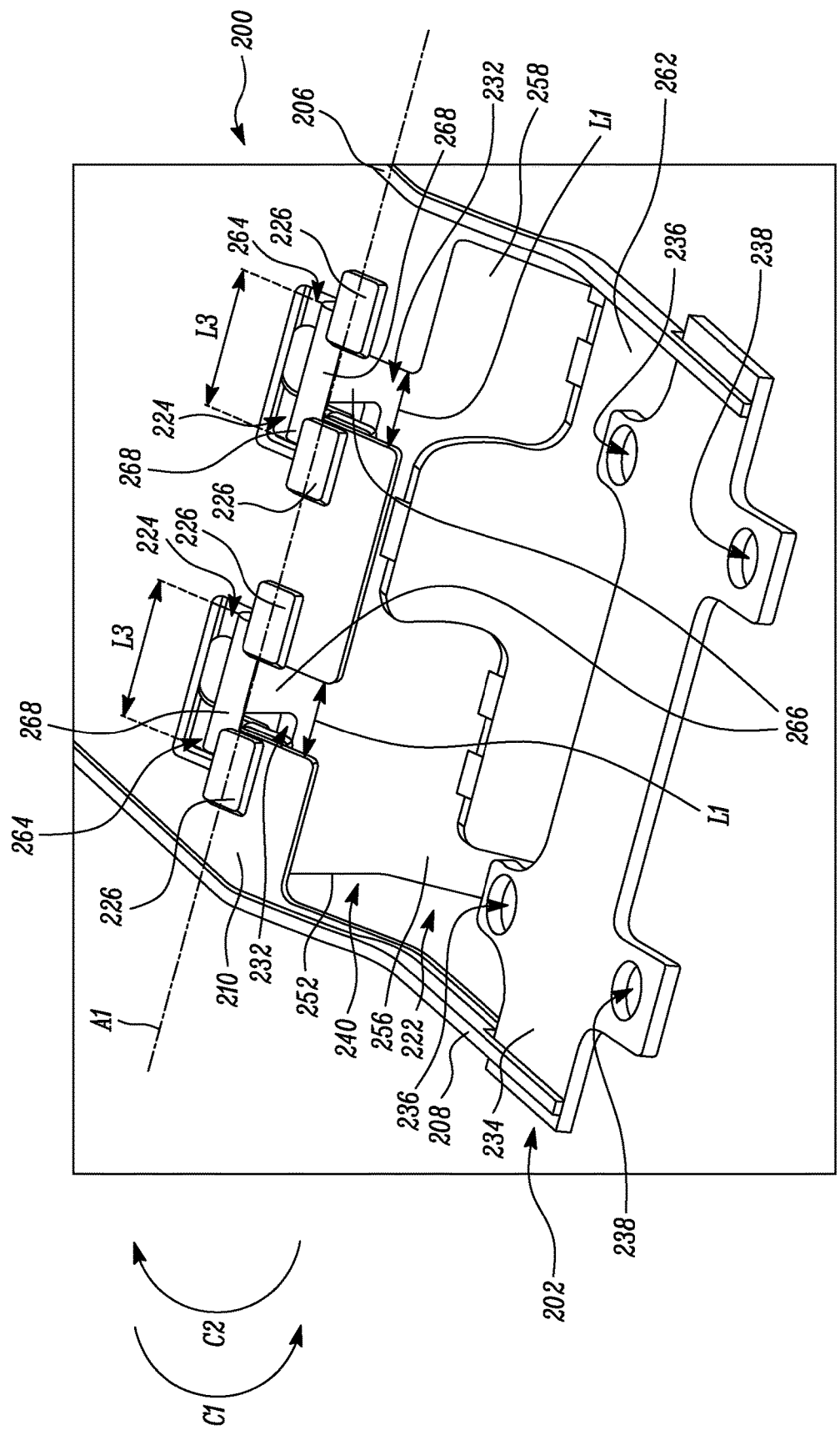
FIG. 4 illustrates a generally downward perspective view of the door coupled to the guard of FIG. 3, according to examples of the present disclosure.

Further, the guard 202 includes a bracket 234 (shown in FIG. 4). The bracket 234 is disposed in the first opening 222. The bracket 234 defines a pair of first through-apertures 236 (shown in FIG. 4) and a pair of second through-apertures 238 (shown in FIG. 4).

As shown in FIG. 2, the guard assembly 200 includes one or more doors 240, 242, 244, 246 removably coupled to the guard 202, 204. The guard assembly 200 includes two doors 240, 242 removably coupled to the guard 202 and two doors 244, 246 removably coupled to the guard 204. Specifically, the door 240 is removably coupled to the central portion 208 and the side portion 210. The door 242 is removably coupled to the central portion 208 and the side portion 212. The pair of doors 240, 242 are symmetrical to each other. Alternatively, the pair of doors 240, 242 may not be symmetrical to each other. Further, the door 244 is removably coupled to the central portion 216 and the side portion 218. Moreover, the door 246 is removably coupled to the central portion 216 and the side portion 220. The pair of doors 244, 246 are symmetrical to each other. Alternatively, the pair of doors 244, 246 may not be symmetrical to each other.

In one example, the doors 240, 242, 244, 246 may be made from a metal, such as steel, aluminum, and the like. It should be noted that the doors 240, 242, 244, 246 may be made from a lightweight material. The doors 240, 242, 244, 246 are similar to each other in shape, dimensions, and material. In some examples, a shape of the doors 240, 242 may slightly vary from a shape of the doors 244, 246 based on a design of the guards 202, 204. In some examples, the doors 244, 246 may include a pair of chamfers 270 (shown in FIG. 5). In other examples, the doors 244, 246 may omit the chamfers 270.

For explanatory purposes, the door 240 associated with the guard 202 and coupled to the side portion 210 and the central portion 208 will now be explained in relation to FIG. 3. However, it should be noted that the details provided herein are equally applicable to the doors 242, 244, 246. As shown in FIG. 3, the door 240 defines a first end 248 and a second end 250. The door 240 may be removably coupled to the central portion 208 of the guard 202 proximal to the first end 248 of the door 240. Further, the door 240 may be removably coupled to the side portion 210 of the guard 202 proximal to the second end 250 of the door 240.

Figure 5:
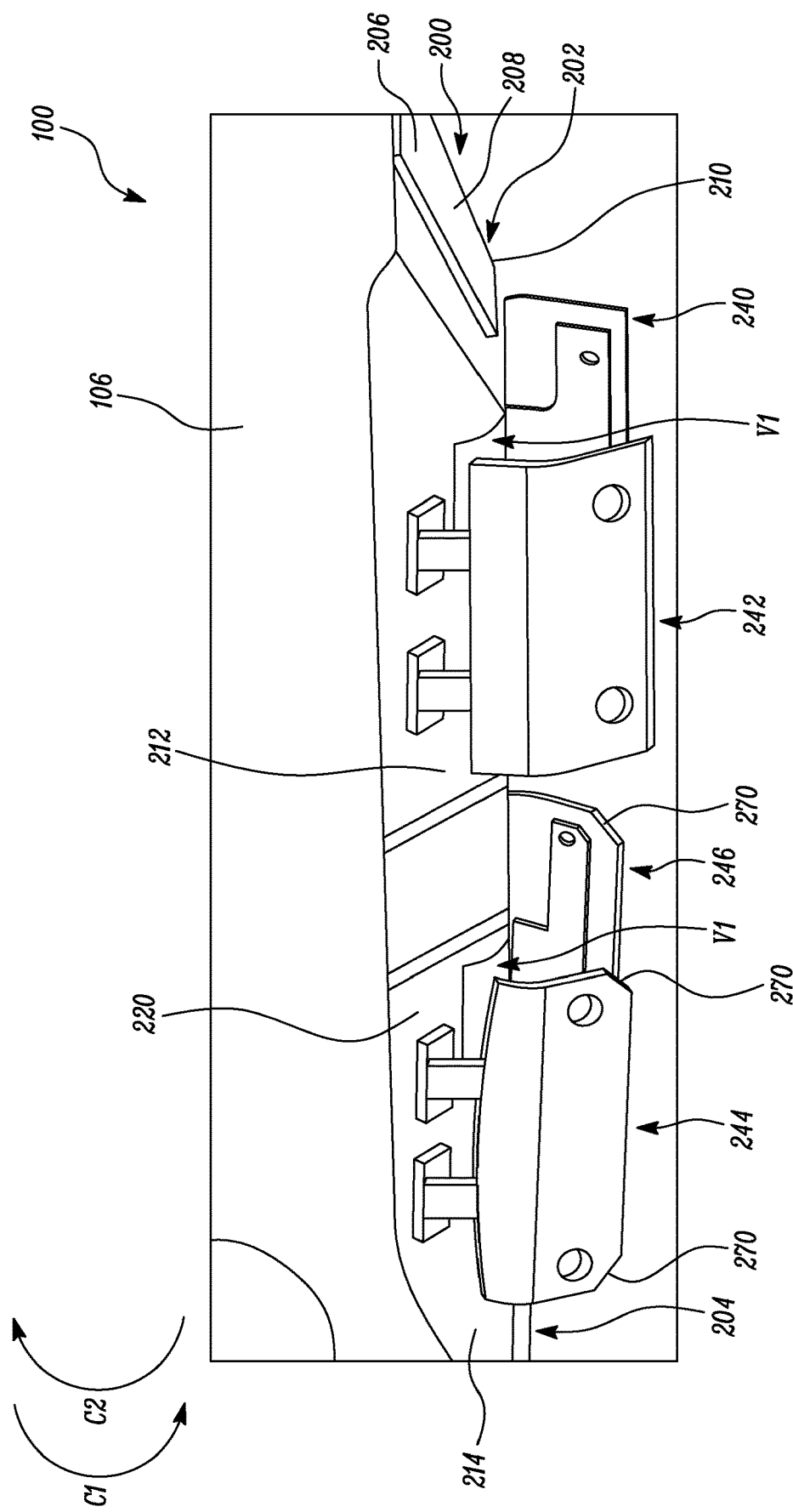
FIG. 5 illustrates a number of doors associated with the guard assembly of FIG. 2 in an open position, according to examples of the present disclosure.

The door 240 is movable between an open position (as illustrated in FIGS. 3 and 5) and a closed position (as illustrated in FIG. 2). Further, in the open position of the door 240, the door 240 provides access to the volume "V1" (see FIG. 5) and, in the closed position of the door 240, the door 240 limits access to the volume "V1".

The door 240 includes a plate 252 removably coupled to the guard 202 proximal to the first end 248 of the door 240 by one or more fasteners 254 (see FIG. 2). In some examples, the plate 252 is removably coupled to the guard 202 by two fasteners 254. The fasteners 254 may include a bolt and nut, a screw, a pin, and the like. The plate 252 includes a first section 256 and a second section 258. The first section 256 is defined proximal to the first end 248 of the door 240. Further, the second section 258 is defined proximal to the second end 250 of the door 240.

The plate 252 includes one or more through-apertures 260 defined proximal to the first end 248 of the door 240 for receiving the fastener 254. Specifically, the first section 256 defines two through-apertures 260 proximal to the first end 248 of the door 240. Each through-aperture 260 aligns with a corresponding first through-aperture 236 (see FIG. 4) in the bracket 234 (see FIG. 4) to receive the fastener 254. Further, in some examples, the door 240 may include a reinforcing plate 262 coupled to the plate 252. The reinforcing plate 262 may be welded to the plate 252. The reinforcing plate 262 may be provided to improve the strength and sturdiness of the door 240. It should be noted that the reinforcing plate 262 is optional and may be omitted, without limiting the scope of the present disclosure.

Further, the door 240 includes one or more coupling arrangements 264 extending from the plate 252 for pivotably coupling the plate 252 to the guard 202 proximal to the second end 250 of the door 240. The door 240 is movable between the open position and the closed position based on a pivoting action of the coupling arrangement 264 relative to the guard 202. In the illustrated embodiment of FIG. 3, the door 240 includes a pair of coupling arrangements 264. The coupling arrangements 264 can be identical to each other. Alternatively, the door 240 may include a single coupling arrangement or more that two coupling arrangements, without any limitations.

The coupling arrangement 264 includes a first portion 266 coupled to the plate 252. The first portion 266 is integral with the plate 252. Further, the first portion 266 is substantially perpendicular to the second section 258 of the plate 252. The first portion 266 is embodied as a rectangular plate herein. The first portion 266 defines a length "L2", such that the length "L2" is slightly lesser than the first length "L1" of the channel 232. Further, the coupling arrangement 264 also includes a second portion 268 extending from the first portion 266. The second portion 268 is receivable within the second opening 224. The second portion 268 is integral with the first portion 266 such that the first portion 266 extends between the second section 258 and the second portion 268. Further, the second portion 268 is substantially perpendicular to the first portion 266. The second portion 268 is embodied as a solid cylindrical shaped member. Taken together, the first portion 266 and the second portion 268 can have a "T" shape.

As shown in FIG. 4, in the open position or the closed position of the door 240, the second portion 268 of the coupling arrangement 264 is retained within the second opening 224 by the pair of first retention tabs 226 and the pair of second retention tabs 228. The door 240 is disposed in the open position in FIG. 4. In some examples, the second portion 268 may rest on the pair of second retention tabs 228 when the door 240 is being moved between the open and the closed positions. The second portion 268 rotates within the second opening 224 for moving the door 240 between the open position and the second position; this is facilitated by the cylindrical shape of the second portion 268, which, together with the first retention tabs 226 and the second retention tabs 228, forms a hinge joint.

Further, the second portion 268 may be narrower in a widthwise direction than the second opening 224, meaning the second portion 268 may be maintained in position by the first retention tabs 226 and the second retention tabs 228. In some examples, the first retention tabs 226 and the second retention tabs 228 may be joined to the side portion 210 using any suitable attachment technique, such as welding, adhesives, and/or mechanical fasteners. The second portion 268 defines a second length "L3". Further, the first length "L1" defined by the channel 232 is less than the second length "L3" defined by the second portion 268 of the coupling arrangement 264 to restrict a passage of the second portion 268 through the channel 232 when the door 240 is in the open position or the closed position.

For moving the door 240 from the closed position to the open position, a personnel may remove the fasteners 254 (see FIG. 2) to disengage the door 240 from the central portion 208. Further, the removal of the fasteners 254 may cause the door 240 to pivot relative to the guard 202 based on the pivoting action of the coupling arrangement 264. Specifically, under the influence of gravity or guided by service personnel, the second portion 268 of the coupling arrangement 264 rotates in a counterclockwise direction "C1" within the second opening 224 to pivot the door 240 relative to the guard 202. Further, the door 240 itself moves in the counterclockwise direction "C1" based on the pivoting action of the coupling arrangement 264 to dispose the door 240 in the open position.

The door 240 is shown in the open position in FIG. 5. For moving the door 240 from the open position to the closed position, the personnel may move the door 240 in a clockwise direction "C2". The movement of the door 240 in the clockwise direction "C2" may cause the second portion 268 (see FIG. 4) of the coupling arrangement 264 (see FIG. 4) to rotate in the clockwise direction "C2" within the second opening 224 (see FIG. 4). Further, the personnel may couple the fasteners 254 (see FIG. 2) to engage the door 240 with the central portion 208.

Figure 6:
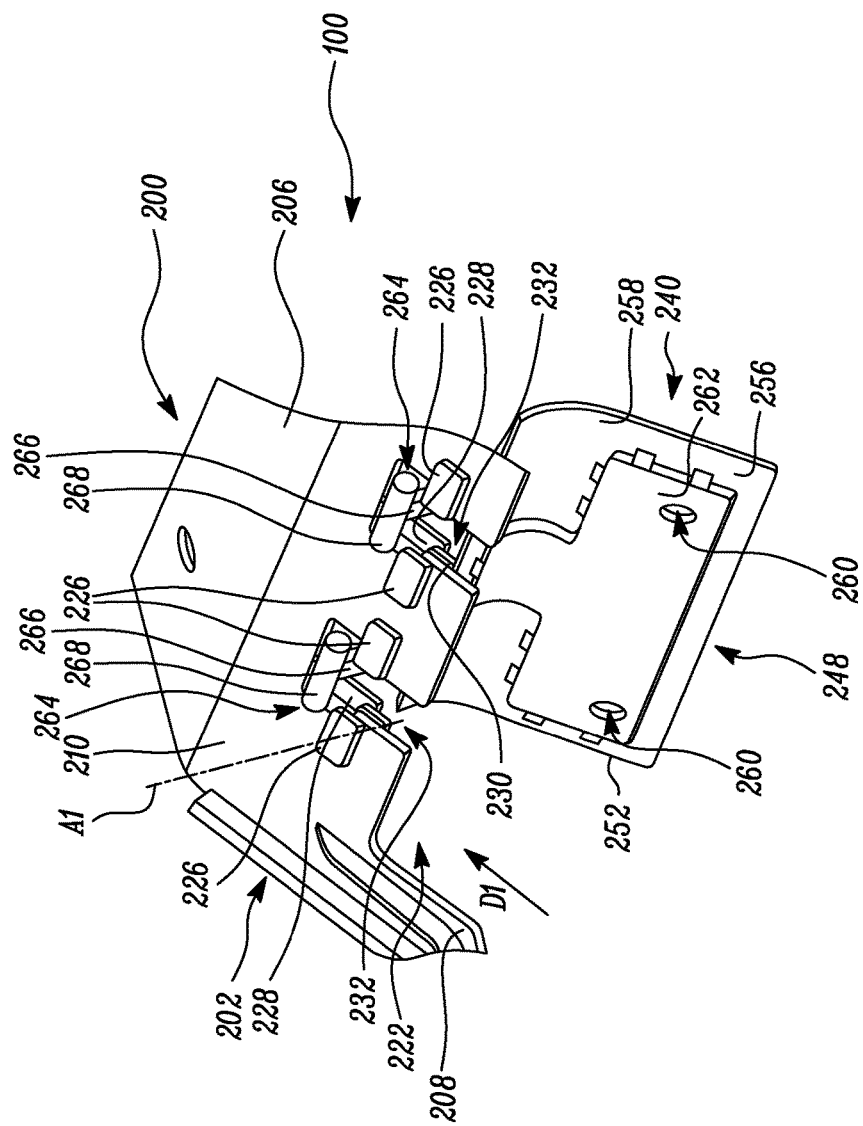
FIGS. 6 and 7 illustrate the door of FIG. 4 disengaged from the guard of FIG. 3, according to examples of the present disclosure.

It should be further noted that the door 240 may be removed from the guard 202 for servicing or replacement purposes. More particularly, as shown in FIG. 6, the door 240 is removable from the guard 202 based on a lifting of the door 240 away from the second opening 224 (see FIGS. 3 and 4) or away from the pair of first retention tabs 226. The lifting of the door 240 causes the second portion 268 of the coupling arrangement 264 to be removed from the second opening 224. Specifically, the door 240 may be moved in a first direction "D1" to gain clearance to the first retention tabs 226. Subsequently, the door 240 may be lifted perpendicular to the first direction "D1" to remove the second portion 268 from the second opening 224.

Figure 7:
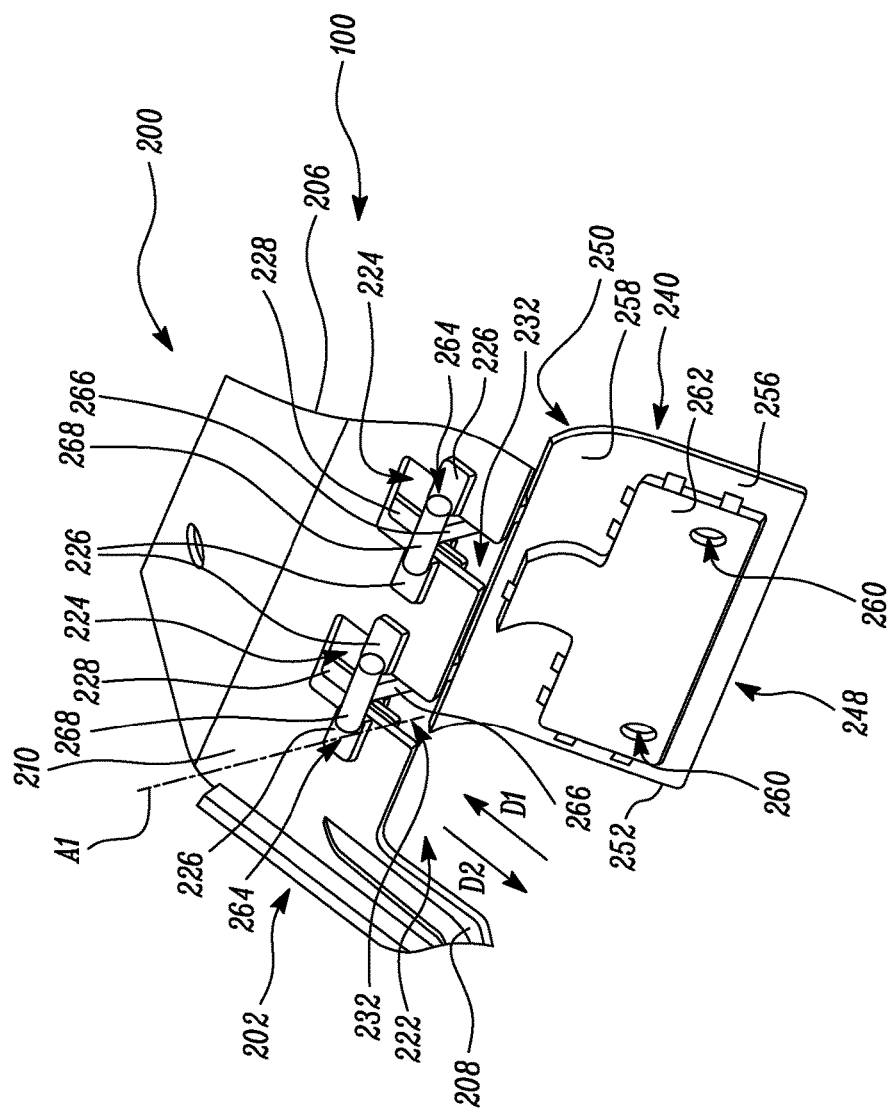

Further, as shown in FIG. 7, the first portion 266 (see FIGS. 3 and 4) of the coupling arrangement 264 may pass through the channel 232 for removing the door 240 from the guard 202. More particularly, the door 240 is moved in a second direction "D2" that is opposite to the first direction "D1" for passing the first portion 266 through the channel 232 to remove the door 240 from the guard 202 through the first opening 222.

INDUSTRIAL APPLICABILITY

The present disclosure relates to the guard assembly 200 having the doors 240, 242, 244, 246. For explanatory purposes, this section will be explained in relation to the door 240 coupled to the guard 202. However, it should be noted that the details provided below are equally applicable to all the other doors 242, 244, 246 of the guard assembly 200. The door 240 described herein is lightweight and simple in design. In some examples, a weight of the door 240 may lie approximately between 40 pounds and 60 pounds, without any limitations. Such a lightweight door 240 may comply with field serviceability weight limit guides, and may therefore allow a single personnel to move the door 240 between the open and the closed positions for cleaning of and access to the interior of the guard 202.

The door 240 is pivotably coupled to the side portion 210 of the guard 202 via the coupling arrangements 264. Such an arrangement of coupling the door 240 with the guard 202 may allow quick and easy movement of the door 240 between the open and the closed positions. Further, the coupling arrangements 264 allow the door 240 to securely hang on to the guard 202 during the cleaning of the guard 202. Specifically, the second portion 268 of the coupling arrangement 264 may be retained within the second opening 224 of the guard 202 when the door 240 is in the open position in part due to contact with the second retention tabs 228. Thus, the second portion 268 may rest on the second retention tabs 228 during the opening of the door 240 and the first retention tabs 226 may resist the second portion 268 from coming out of the second opening 224 in the open and the closed positions of the door 240.

Further, the design of the coupling arrangement 264 in concert with the first and the second retention tabs 226, 228 is such that any possibility of an unintentional disengagement of the coupling arrangement 264 from the guard 202 may be eliminated. More particularly, the first retention tabs 226 retain the second portion 268 within the second opening 224 when the door 240 is in the open position or the closed position. Further, the retention of the door 240 with the guard 202 in the open and the closed positions of the door 240 may also improve ergonomics during the movement of the door 240 between the open and the closed positions as the personnel may not have to hold the entire weight of the door 240 in place. More particularly, the coupling arrangements 264 in concert with the first and the second retention tabs 226, 228 may act as retention features while moving the door 240 between the open and the closed positions.

Further, the door 240 may be easily removed from the guard 202 for servicing or replacement purposes. More particularly, the door 240 may be lifted to remove the second portion 268 of the coupling arrangement 264 from the second opening 224 so that the first portion 266 may pass through the channel 232 for removal of the door 240 from the guard 202. Further, the guard assembly 200 may not require additional tools or equipment for moving the door 240 between the open and the closed positions, for holding the door 240 in the open or the closed positions, or for removing the door 240 from the guard 202.

Figure 8:
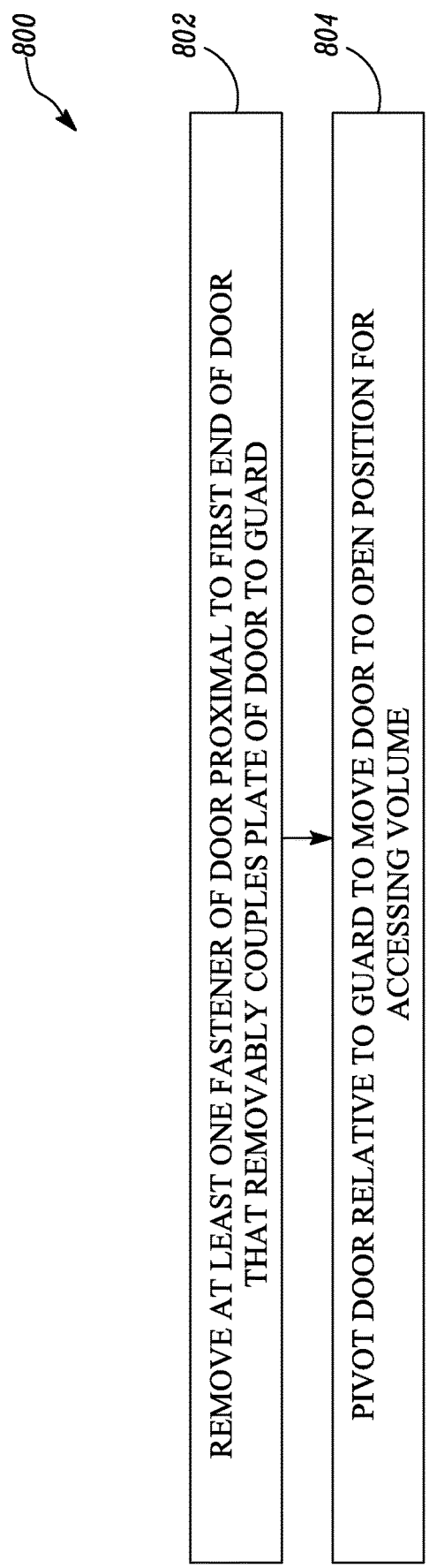
FIG. 8 illustrates a flowchart for a method of accessing a volume defined by the guard of the guard assembly, according to examples of the present disclosure.

FIG. 8 illustrates a flowchart for a method 800 of accessing the volume "V1" in part defined by the guard 202, 204 of the guard assembly 200. The guard assembly 200 is associated with the work machine 100 and includes the one or more doors 240, 242, 244, 246 removably coupled to the guard 202, 204. The method 800 will be explained in relation to the door 240 coupled to the guard 202. However, it should be noted that the method 800 is equally applicable to the doors 242, 244, 246. At step 802, the one or more fasteners 254 of the door 240 proximal to the first end 248 of the door 240 that removably couples the plate 252 of the door 240 to the guard 202 are removed. The guard 202 includes the body 206, such that the body 206 defines the volume "V1", the first opening 222 for accessing the volume "V1", the one or more second openings 224 in communication with the first opening 222, and the one or more pairs of first retention tabs 226 partially overlapping the second opening 224.

At step 804, the door 240 is pivoted relative to the guard 202 to move the door 240 to the open position for accessing the volume "V1". The door 240 includes the one or more coupling arrangements 264 extending from the plate 252 proximal to the second end 250 of the door 240, such that the door 240 is movable between the closed position and the open position based on the pivoting action of the coupling arrangement 264 relative to the guard 202.

Further, the coupling arrangement 264 includes the first portion 266 coupled to the plate 252. The coupling arrangement 264 also includes the second portion 268. The second portion 268 is receivable within the second opening 224. Further, in the open position or the closed position of the door 240, the second portion 268 of the coupling arrangement 264 is retained within the second opening 224 by the pair of first retention tabs 226 and the pair of second retention tabs 228. The pair of second retention tabs 228 are spaced apart from the pair of first retention tabs 226 along the first axis "A1", such that the second opening 224 is defined between the pair of first retention tabs 226 and the pair of second retention tabs 228.

Figure 9:
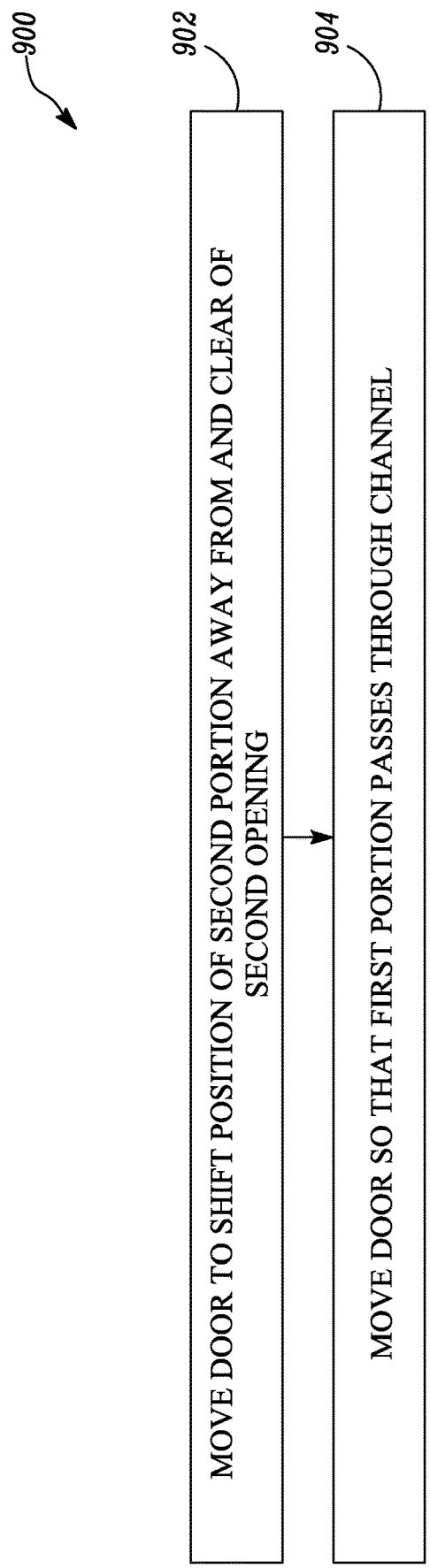
FIG. 9 illustrates a flowchart for a method of removing the door from the guard, according to examples of the present disclosure.

Further, FIG. 9 illustrates a flowchart for a method 900 of removing the door 240 from the guard 202. At a step 902, the door 240 may be removed from the guard 202 based on the lifting of the door 240 away from the second opening 224 or away from the pair of first retention tabs 226. The lifting of the door 240 causes the second portion 268 of the coupling arrangement 264 to be removed from the second opening 224. Moreover, at a step 904, the first portion 266 of the coupling arrangement 264 is passed through the one or more channels 232 defined in the body 206 for removing the door 240 from the guard 202. The channel 232 is defined between the first opening 222 and the second opening 224.

It may be desirable to perform one or more of the step shown in FIG. 8 in an order different from that depicted. Furthermore, various steps could be performed together.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

The invention claimed is:

1. A guard assembly for a work machine, the guard assembly comprising:
   at least one guard including a body, wherein the body in part defines a volume, a first opening for accessing the volume, at least one second opening in communication with the first opening, and at least one pair of first retention tabs partially overlapping the second opening, and wherein the body further defines at least one channel between the first opening and the second opening; and
   at least one door removably coupled to the guard, the door defining a first end and a second end, wherein, in an open position of the door, the door provides access to the volume and, in a closed position of the door, the door limits access to the volume, the door including:
      a plate removably coupled to the guard proximal to the first end of the door by at least one fastener; and
      at least one coupling arrangement extending from the plate for pivotably coupling the plate to the guard proximal to the second end of the door, wherein the door is movable between the open position and the closed position based on a pivoting action of the coupling arrangement relative to the guard, the coupling arrangement including:
         a first portion coupled to the plate; and
         a second portion extending from the first portion, wherein the second portion is receivable within the second opening.

2. The guard assembly of claim 1, wherein a first length defined by the channel is less than a second length defined by the second portion of the coupling arrangement to restrict a passage of the second portion through the channel when the door is in at least one of the open position and the closed position.

3. The guard assembly of claim 1, wherein the door is removable from the guard based on a lifting of the door at least one of away from the second opening and away from the pair of first retention tabs, and wherein the lifting of the door causes the second portion of the coupling arrangement to be removed from the second opening.

4. The guard assembly of claim 1, wherein the first portion of the coupling arrangement is adapted to pass through the channel for removing the door from the guard.

5. The guard assembly of claim 1, wherein the guard includes a pair of second retention tabs that are spaced apart from the pair of first retention tabs along a first axis, such that the second opening is defined between the pair of first retention tabs and the pair of second retention tabs.

6. The guard assembly of claim 5, wherein, in at least one of the open position and the closed position of the door, the second portion of the coupling arrangement is retained within the second opening by the pair of first retention tabs and the pair of second retention tabs.

7. The guard assembly of claim 1, wherein the plate includes at least one through-aperture defined proximal to the first end of the door for receiving the fastener.

8. A work machine comprising:
   a frame; and
   a guard assembly coupled to the frame, the guard assembly including:
      at least one guard including a body, wherein the body in part defines a volume, a first opening for accessing the volume, at least one second opening in communication with the first opening, and at least one pair of first retention tabs partially overlapping the second opening, and wherein the body further defines at least one channel between the first opening and the second opening; and
      at least one door removably coupled to the guard, the door defining a first end and a second end, wherein, in an open position of the door, the door provides access to the volume and, in a closed position of the door, the door limits access to the volume, the door including:
         a plate removably coupled to the guard proximal to the first end of the door by at least one fastener; and
         at least one coupling arrangement extending from the plate for pivotably coupling the plate to the guard proximal to the second end of the door, wherein the door is movable between the open position and the closed position based on a pivoting action of the coupling arrangement relative to the guard, the coupling arrangement including:
            a first portion coupled to the plate; and
            a second portion extending from the first portion, wherein the second portion is receivable within the second opening.

9. The work machine of claim 8, wherein a first length defined by the channel is less than a second length defined by the second portion of the coupling arrangement to restrict a passage of the second portion through the channel when the door is in at least one of the open position and the closed position.

10. The work machine of claim 8, wherein the door is removable from the guard based on a lifting of the door at least one of away from the second opening and away from the pair of first retention tabs, and wherein the lifting of the door causes the second portion of the coupling arrangement to be removed from the second opening.

11. The work machine of claim 8, wherein the first portion of the coupling arrangement is adapted to pass through the channel for removing the door from the guard.

12. The work machine of claim 8, wherein the guard includes a pair of second retention tabs that are spaced apart from the pair of first retention tabs along a first axis, such that the second opening is defined between the pair of first retention tabs and the pair of second retention tabs.

13. The work machine of claim 12, wherein, in at least one of the open position and the closed position of the door, the second portion of the coupling arrangement is retained within the second opening by the pair of first retention tabs and the pair of second retention tabs.

14. The work machine of claim 8, wherein the plate includes at least one through-aperture defined proximal to the first end of the door for receiving the fastener.

15. A method of accessing a volume in part defined by a guard of a guard assembly, wherein the guard assembly is associated with a work machine and includes at least one door removably coupled to the guard, the method comprising:
   removing at least one fastener of the door proximal to a first end of the door that removably couples a plate of the door to the guard, wherein the guard includes a body, such that the body in part defines the volume, a first opening for accessing the volume, at least one second opening in communication with the first opening, and at least one pair of first retention tabs partially overlapping the second opening;
   pivoting the door relative to the guard to move the door to an open position for accessing the volume,
      wherein the door includes at least one coupling arrangement extending from the plate proximal to a second end of the door, such that the door is movable between a closed position and the open position based on a pivoting action of the coupling arrangement relative to the guard,
      wherein the coupling arrangement includes a first portion coupled to the plate, and
      wherein the coupling arrangement includes a second portion, the second portion being receivable within the second opening; and
   removing the door from the guard based on a lifting of the door at least one of away from the second opening and away from the pair of first retention tabs,
      wherein the lifting of the door causes the second portion of the coupling arrangement to be removed from the second opening.

16. The method of claim 15, further comprising passing the first portion of the coupling arrangement through at least one channel defined in the body for removing the door from the guard, wherein the channel is defined between the first opening and the second opening.

17. The method of claim 15, further comprising retaining, in at least one of the open position and the closed position of the door, the second portion of the coupling arrangement within the second opening by the pair of first retention tabs and a pair of second retention tabs, the pair of second retention tabs being spaced apart from the pair of first retention tabs along a first axis, such that the second opening is defined between the pair of first retention tabs and the pair of second retention tabs.

* * * * *